(12) United States Patent
Torchio

(10) Patent No.: US 7,963,300 B2
(45) Date of Patent: Jun. 21, 2011

(54) FLEXIBLE HOSE ARTICLE AND RELATED METHODS

(75) Inventor: Bruno Ranieri Torchio, Sao Paulo (BR)

(73) Assignee: Veyance Technologies, Inc., Fairlawn, OH (US)

( * ) Notice: Subject to any disclaimer, the term of this patent is extended or adjusted under 35 U.S.C. 154(b) by 903 days.

(21) Appl. No.: 11/927,797

(22) Filed: Oct. 30, 2007

(65) Prior Publication Data

US 2009/0107571 A1    Apr. 30, 2009

(51) Int. Cl.
*F16L 11/00* (2006.01)
(52) U.S. Cl. ......... 138/133; 138/134; 138/127; 138/120
(58) Field of Classification Search ............. 138/DIG. 8, 138/133–135, 155, 120, 127
See application file for complete search history.

(56) References Cited

U.S. PATENT DOCUMENTS

| | | | | |
|---|---|---|---|---|
| 1,661,835 A | * | 3/1928 | Keller | 29/423 |
| 1,941,151 A | * | 12/1933 | Nigro | 138/134 |
| 2,045,568 A | * | 6/1936 | Gorman | 464/174 |
| 2,152,588 A | * | 3/1939 | Griesemer | 361/215 |
| 2,475,591 A | * | 7/1949 | Chernack | 138/133 |
| 3,613,736 A | | 10/1971 | Kuwabara | 285/239 |
| 3,682,202 A | | 8/1972 | Buhrmann et al. | 138/126 |
| 3,779,308 A | | 12/1973 | Buhrmann et al. | 165/51 |
| 3,787,956 A | | 1/1974 | Miller | 29/451 |
| 4,019,939 A | | 4/1977 | Barbier et al. | 156/80 |
| 4,020,719 A | | 5/1977 | Houck et al. | 81/9.3 |
| 4,108,701 A | | 8/1978 | Stanley | 156/160 |
| 4,123,088 A | | 10/1978 | Tanaka | 285/14 |
| 4,154,266 A | | 5/1979 | Tanaka et al. | 138/109 |
| 4,168,198 A | | 9/1979 | Stanley | 156/393 |
| 4,182,019 A | | 1/1980 | Tally et al. | 29/453 |
| 4,366,842 A | | 1/1983 | Peavy et al. | 138/109 |
| 4,446,198 A | | 5/1984 | Shemenski et al. | 428/625 |
| 4,545,834 A | | 10/1985 | Shemenski et al. | 600/413 |
| 4,585,035 A | | 4/1986 | Piccoli | 138/127 |
| 4,668,319 A | | 5/1987 | Piccoli | 156/149 |
| 4,738,816 A | | 4/1988 | Anderson | 264/313 |
| 5,391,334 A | | 2/1995 | Enomoto | 264/40.7 |
| 5,453,229 A | | 9/1995 | Enomoto | 264/40.7 |
| 5,634,497 A | | 6/1997 | Neto | 138/127 |
| 5,698,278 A | | 12/1997 | Emond et al. | 428/34.5 |
| 6,338,365 B1 | * | 1/2002 | Odru | 138/134 |
| 6,978,806 B2 | * | 12/2005 | Glejbol et al. | 138/134 |
| 7,080,858 B2 | | 7/2006 | Sanches et al. | 285/222.1 |
| 7,132,481 B2 | | 11/2006 | Burkholder et al. | 525/332.6 |
| 2003/0121559 A1 | * | 7/2003 | Glejbol et al. | 138/135 |

* cited by examiner

*Primary Examiner* — Patrick F Brinson
(74) *Attorney, Agent, or Firm* — Alvin T. Rockhill; Kathleen K. Bowen

(57) ABSTRACT

The present invention generally relates to flexible hose articles and methods. Some embodiments include hoses that can be reversibly bent and/or shaped. Furthermore, some embodiments can comprise methods for making and/or using such hose articles.

Figure 1:
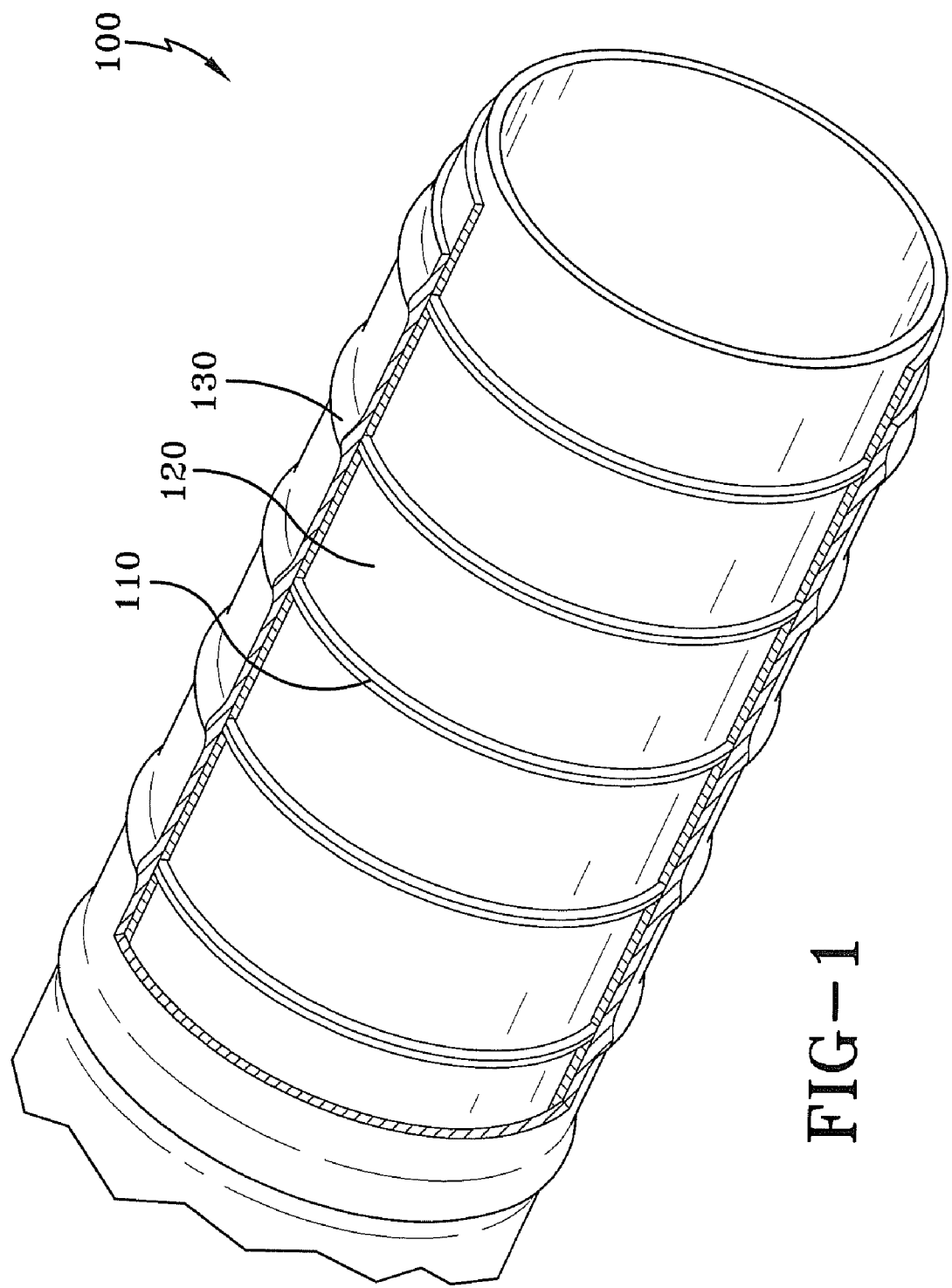

14 Claims, 1 Drawing Sheet

FLEXIBLE HOSE ARTICLE AND RELATED METHODS

I. BACKGROUND OF THE INVENTION

A. Field of Invention

The present invention generally relates to flexible hose articles and methods. Some embodiments relate to hoses that can be reversibly bent and/or shaped. Some embodiments related to methods for making and using such hoses.

B. Description of the Related Art

Wire reinforced hoses are known in the art. According to the prior art a hose article can be reinforced using a helical wire reinforcing member. Typically, the wire reinforcing member is sandwiched between one or more layers of polymer. Such hoses tend to be difficult to bend. Accordingly, there is a need in the art for wire reinforced hoses that are easier to bend as compared to existing hoses.

The present invention provides hose articles that differ from hoses that are currently available. The present invention also provides methods related to such articles.

II. SUMMARY OF THE INVENTION

Some embodiments of the present invention relate to A hose article, comprising: a pair of longitudinally joined helical wires defining a double helix; and at least one containment layer in contact with the pair of helical wires.

Other embodiment relate to a process for making a hose article, comprising the steps of: forming a pair of wires into a helix, the pair of wires being longitudinally joined; joining the helix to at least one layer disposed radially inward relative to the pair of helical wires; and providing at least one layer disposed radially outward relative to the pair of helical wires.

Still other embodiments relate to a hose article, comprising: a reversibly bending means for reversibly bending a hose article and maintaining the bent conformation without the need for a applying a continuing bending force; and at least one containing means for containing fluids to a region within the reversibly bending means.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a cut-away drawing showing an embodiment having a pair of helical wires sandwiched between a core layer and two over-layers.

IV. DETAILED DESCRIPTION OF THE INVENTION

As used herein the term bonding includes adhesion and cohesion processes including using chemical one or more means to cause one body to adhere to another body. As used herein, the term binding includes mechanically securing, for instance, by wrapping or tying. As used herein the term pitch includes the number of windings per unit length. As used herein the term gauge, where the gauge is given in units of length, includes a diameter of an object.

The present invention generally relates to flexible hose articles and methods. Some embodiments include hoses that can be reversibly bent and/or shaped. Furthermore, some embodiments can comprise methods for making and/or using such hose articles.

According to some embodiments, a hose article comprises a pair of helical wires in or on the hose wall. Such embodiments also include at least one containment layer defining at least a portion of a hose wall thickness, which is adapted to contain one or more fluids. For example, a typical containment layer can comprise a cylindrical structure defining a longitudinal axis, and having a first end and a second end, and having a continuous radial surface. The continuous radial surface includes at least one interior wall defining a space for containing liquid, and the interior wall connects the first end and the second end, thereby forming a hollow cylindrical structure having two open ends. Such containment spaces can be, for example, cylindrical in shape.

The hose article can have an internal diameter ranging from about 2 inch to about 24 inches. According to some embodiments, the inner diameter can be from about 2 inches to about 3 inches, from about 3 inches to about 4 inches, from about 4 inches to about 5 inches, from about 5 inches to about 6 inches, from about 6 inches to about 7 inches, from about 7 inches to about 8 inches, from about 8 inches to about 9 inches, from about 9 inches to about 10 inches, from about 10 inches to about 11 inches, from about 11 inches to about 12 inches, from about 12 inches to about 13 inches, from about 13 inches to about 14 inches, from about 14 inches to about 15 inches, from about 15 inches to about 16 inches, from about 16 inches to about 17 inches, from about 17 inches to about 18 inches, from about 18 inches to about 19 inches, from about 19 inches to about 20 inches, from about 20 inches to about 21 inches, from about 21 inches to about 22 inches, from about 22 inches to about 23 inches, or from about 23 inches to about 24 inches. Here as elsewhere in the specification and claims, ranges may be combined.

In some embodiments, the containment layer can comprise one or more organic polymers. Suitable containment layers can comprise any of a variety of polymeric compositions including, without limitation, chlorosulfonated polyethylene, a chlorosulfonated polyethylene/chlorinated polyethylene blend, a hydrogenated nitrile rubber or a nitrile rubber, polychloroprene, chlorinated polyethylene acrylonitrile-butadiene, styrene butadiene, polyisoprene, polybutadiene, ethylene-propylene-diene terpolymers, chlorinated polyethylene, natural rubber polymers. Containment layers can also include thermoplastic elastomers such as, but not limited to, propylene modified with ethylene-propylene rubber (e.g. Santoprene®, available from Monsanto Corporation); block polymers, such as the Kraton® line of polymers available from Shell Chemical Company; polyvinyl chloride, and the like, or any combination thereof. These elastomers may be compounded with other filler, plasticizers, antioxidants, and cure systems to achieve particular properties desired for a given application, as known in the art.

In some embodiments, the containment layer can comprise a plurality of layers. For example, a containment layer can include one, two, three or more layers. In some embodiments a containment layer comprises a core layer, and any number and variety of over-layers disposed radially outward relative to the core layer. The pair of helical wires can be disposed in, on or between any of these layers. Furthermore, in some embodiments, an over-layer can comprise a continuous layer, a composite layer, or a structured layer. According to a non-limiting example, a composite layer can comprise a matrix polymer having a reinforcing material disposed therein, and a structured layer can comprise braided, wound or knotted fibers.

The pair of helical wires can comprise any of a variety of materials including, without limitation, steel, stainless steel, spring steel, iron, copper, aluminum, zinc, nickel, and the like or any combination thereof. According to some embodiments, the wires can comprise a gauge from about 0.045 inches to about 0.5 inches. Other gauges include diameters from about 0.045 inches to about 0.050 inches, from about 0.050 inches to about 0.060 inches, from about 0.060 inches to about 0.070 inches, from about 0.070 inches to about 0.080 inches, from about 0.080 inches to about 0.090 inches, from about 0.090 inches to about 0.100 inches, from about 0.100 inches to about 0.110 inches, from about 0.110 inches to about 0.120 inches, from about 0.120 inches to about 0.130 inches, from about 0.130 inches to about 0.140 inches, from about 0.140 inches to about 0.150 inches, from about 0.150 inches to about 0.160 inches, from about 0.160 inches to about 0.170 inches, from about 0.170 inches to about 0.180 inches, from about 0.180 inches to about 0.190 inches, from about 0.190 inches to about 0.200 inches, from about 0.200 inches to about 0.210 inches, from about 0.210 inches to about 0.220 inches, from about 0.220 inches to about 0.230 inches, from about 0.230 inches to about 0.240 inches, from about 0.240 inches to about 0.250 inches, from about 0.250 inches to about 0.260 inches, from about 0.260 inches to about 0.270 inches, from about 0.270 inches to about 0.280 inches, from about 0.280 inches to about 0.290 inches, from about 0.290 inches to about 0.300 inches, from about 0.300 inches to about 0.310 inches, from about 0.310 inches to about 0.320 inches, from about 0.320 inches to about 0.330 inches, from about 0.330 inches to about 0.340 inches, from about 0.340 inches to about 0.350 inches, from about 0.350 inches to about 0.360 inches, from about 0.360 inches to about 0.370 inches, from about 0.370 inches to about 0.380 inches, from about 0.390 inches to about 0.400 inches, from about 0.400 inches to about 0.410 inches, from about 0.410 inches to about 0.420 inches, from about 0.420 inches to about 0.430 inches, from about 0.430 inches to about 0.440 inches, from about 0.440 inches to about 0.450 inches, from about 0.450 inches to about 0.460 inches, from about 0.460 inches to about 0.470 inches, from about 0.470 inches to about 0.480 inches, from about 0.480 inches to about 0.490 inches, or from about 0.490 inches to about 0.500 inches. Furthermore, each of a pair of wires can have a gauge differing from, or the same as, the other wire or wires.

In one embodiment, the wires are oriented adjacently and aligned longitudinally relative to each other. According to some embodiments, the wires are joined by one or more means such as, without limitation, welding, brazing, bonding, or binding. In other embodiments the wires are not joined. In some embodiments, the wires define a helix having a pitch from about 130 windings per foot to about 0.1 windings per foot. In other embodiments the wires can define a helix having a pitch from about 130 windings per foot to about 120 windings per foot, from about 120 windings per foot to about 110 windings per foot, from about 110 windings per foot to about 100 windings per foot, from about 100 windings per foot to about 90 windings per foot, from about 90 windings per foot to about 80 windings per foot, from about 80 windings per foot to about 70 windings per foot, from about 70 windings per foot to about 60 windings per foot, from about 60 windings per foot to about 50 windings per foot, from about 50 windings per foot to about 40 windings per foot, from about 40 windings per foot to about 30 windings per foot, from about 30 windings per foot to about 20 windings per foot, from about 20 windings per foot to about 10 windings per foot, from about 10 windings per foot to about 1 windings per foot, or even from about 1 windings per foot to about 0.1 windings per foot.

The helix can have an internal diameter ranging from about 1 inch to about 12 inches. According to some embodiments, hose articles can have internal diameters from about 1 inch to about 2 inches, from about 2 inches to about 3 inches, from about 3 inches to about 4 inches, from about 4 inches to about 5 inches, from about 5 inches to about 6 inches, from about 6 inches to about 7 inches, from about 7 inches to about 8 inches, from about 8 inches to about 9 inches, from about 9 inches to about 10 inches, from about 10 inches to about 11 inches, or even from about 11 inches to about 12 inches.

According to some embodiments, as the internal diameter of the hose article increases, the wire gauge increases. According to other embodiments, as internal diameter of the hose article increases, the wire pitch decreases. According to still other embodiments, the relationship between the hose inner diameter and the wire gauge is not necessarily linear, and can vary in any of a wide variety of patterns.

Referring now to the drawings wherein the showings are for purposes of illustrating embodiments of the invention only and not for purposes of limiting the same, FIG. 1 shows an embodiment of the present invention.

According to FIG. 1, and embodiment 100 can comprise a core layer 120, surrounded by a pair of helical wires 110, and one or more layers 130 over the helical wires 110. According to this example, the embodiment 100 can be bent, and the bent configuration can be maintained by the helical wires 110. Furthermore, the embodiment 100 can be straightened and bent again any number of times, in any number of configurations. Thus, the embodiment 100 is reversibly bendable.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A hose article, comprising: a pair of longitudinally joined helical wires defining a double helix; and at least one containment layer in contact with the pair of helical wires, wherein the at least one containment layer comprises: at least one layer disposed radially inward relative to the pair of helical wires; and at least one layer disposed radially outward relative to the pair of helical wires, and wherein the at least one layer disposed radially inward comprises a material selected from the group consisting of chlorosulfonated polyethylene, chlorosulfonated polyethylene/chlorinated polyethylene blends, hydrogenated nitrile rubber, nitrile rubber, polychloroprene, chlorinated polyethylene acrylonitrile-butadiene polymers, styrene-butadiene polymers, polyisoprene, polybutadiene, ethylene-propylene-diene terpolymers, chlorinated polyethylene, natural rubber polymers, propylene/ethylene-propylene rubber blends, and combination thereof.

2. The article of claim 1, wherein one or more of the helical wires comprise a gauge from about 0.045 inches to about 0.500 inches.

3. The article of claim 1, wherein one or more of the helical wires comprise a material selected from the group consisting of steel, spring steel, stainless steel, and aluminum.

4. The article of claim 1, wherein the pair of helical wires define a pitch from about 130 windings per foot to about 0.1 windings per foot.

5. The article of claim 1, wherein the pair of helical wires is joined by a means selected from the group consisting of welding, brazing, and binding.

6. The article of claim 1, wherein the pair of helical wires comprises a pair of helical wires.

7. The article of claim 1, wherein the hose defines an internal diameter from about 2 inches to about 24 inches.

8. A hose article, comprising: a pair of longitudinally joined helical wires defining a double helix; and at least one containment layer in contact with the pair of helical wires, wherein the at least one containment layer comprises: at least one layer disposed radially inward relative to the pair of helical wires; and at least one layer disposed radially outward relative to the pair of helical wires, and wherein the at least one layer disposed radially, outward comprises a material selected from the group consisting of chlorosulfonated polyethylene, chlorosulfonated polyethylene/chlorinated polyethylene blend, hydrogenated nitrile rubber, nitrite rubber, polychloroprene, chlorinated polyethylene acrylonitrile-butadiene polymers, styrene butadiene polymers, polyisoprene, polybutadiene, ethylene-propylene-diene terpolymers, chlorinated polyethylene, natural rubber polymers; propylene/ethylene-propylene rubber blends, and combination thereof.

9. The article of claim 8, wherein one or more of the helical wires comprise a gauge from about 0.045 inches to about 0.500 inches.

10. The article of claim 8, wherein one or more of the helical wires comprise a material selected from the group consisting of steel, spring steel, stainless steel, and aluminum.

11. The article of claim 8, wherein the pair of helical wires define a pitch from about 130 windings per foot to about 0.1 windings per foot.

12. The article of claim 8, wherein the pair of helical wires is joined by a means selected from the group consisting of welding, brazing, and binding.

13. The article of claim 8, wherein the pair of helical wires comprises a pair of helical wires.

14. The article of claim 8, wherein the hose defines an internal diameter from about 2 inches to about 24 inches.

* * * * *